July 10, 1928.  1,676,444
J. F. KITCHEN
DEMAND LIMITING AND VOLUMETRIC METER
Filed Aug. 14, 1923   2 Sheets-Sheet 1
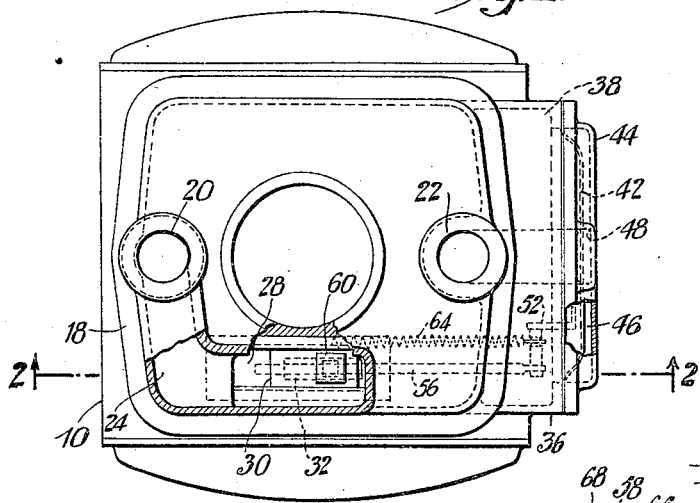
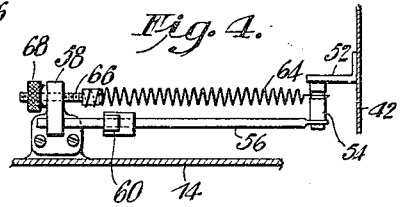
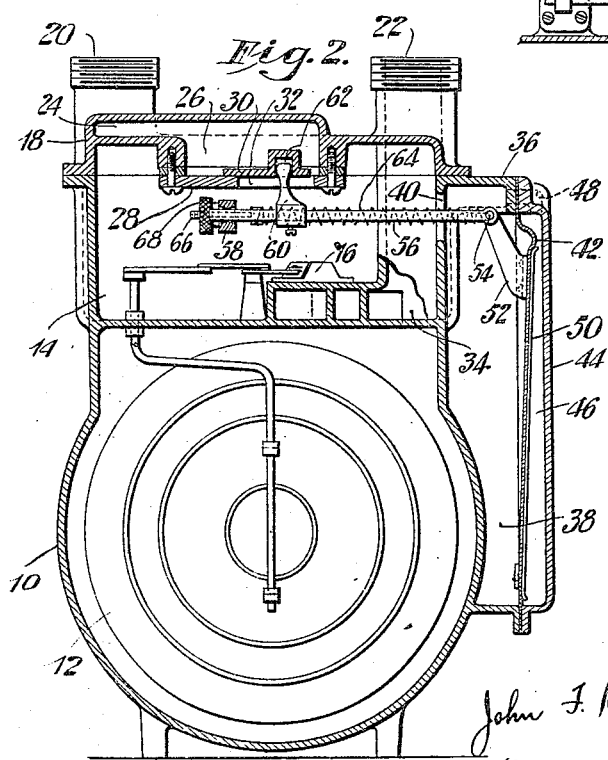
John F. Kitchen, Inventor
By His Attorney
Edmund G. Borden July 10, 1928.

J. F. KITCHEN 1,676,444

DEMAND LIMITING AND VOLUMETRIC METER

Filed Aug. 14, 1923    2 Sheets-Sheet 2

Patented July 10, 1928.

1,676,444

UNITED STATES PATENT OFFICE.

JOHN F. KITCHEN, OF ERIE, PENNSYLVANIA, ASSIGNOR, BY MESNE ASSIGNMENTS, TO DOHERTY RESEARCH COMPANY, OF NEW YORK, N. Y., A CORPORATION OF DELAWARE.

DEMAND LIMITING AND VOLUMETRIC METER.

Application filed August 14, 1923. Serial No. 657,326.

My invention relates to the art of gas distribution. One of the objects of the present invention is to provide an apparatus by which the volume of gas used by a given consumer shall be metered and also a limit set to the rate at which said consumer may use gas which shall be simple and reliable, but occupy a minimum of space.

A further object of my invention is to provide an arrangement whereby the drop in pressure across the ordinary volumetric meter may be utilized to operate a demand limiting valve and have a reserve of power for this purpose.

One embodiment of the present invention is hereinafter described in detail and said invention together with further objects and advantages, may be clearly understood from the following description taken in connection with the accompanying drawing in which Fig. 1 is a plan view of an apparatus according to the present invention, parts being broken away for purposes of illustration;

Fig. 2 is a vertical sectional view partly on the line 2—2 of Fig. 1, parts, however, being broken away and parts being shown in section behind the said plane of section to more clearly illustrate the passages connecting the bellows chambers with the outlet;

Fig. 4 is a detail fully illustrating parts of the operating mechanism of the demand limiting valve.

Figure 3:
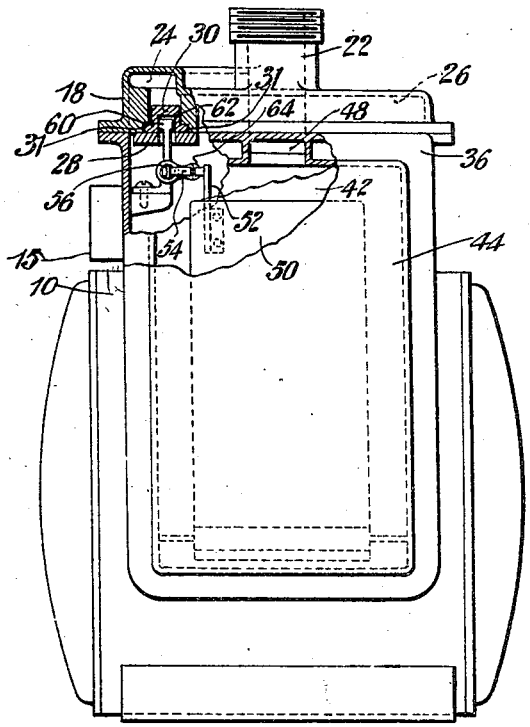
Fig. 3 is an elevation taken at right angles to Fig. 2, parts being broken away and parts being shown in section for purposes of illustration.

The preferred form of the invention is illustrated in the accompanying drawing in which 10 is a casing of the ordinary iron meter which is provided with a chamber 12 containing the ordinary bellows of the dry type meter. A valve chamber 14 is formed in the upper portion of the casing in which are located the volumetric measuring device valves 16 and the counting or integrating means for making a record of the gas being measured as by an indicator 15. The chamber 14 is covered by a casting 18 which has a gas inlet 20 and a gas outlet 22. The gas to be measured enters through the inlet 20, flows through a passage 24, Fig. 1, into a valve chamber 26. The lower side of the valve chamber 26 is closed by a plate 28 which has an opening 32 therein arranged to be covered by a slide valve 30. The slide valve 30 is slidably mounted between undercut portions 31 in the casting 18 and the cover plate 28. The valve 30 forms a demand limiting valve by which the amount of gas passing through the inlet to the measuring mechanism may be accurately controlled. The gas passing through the valve 30 enters the chamber 14 then passes into the bellows chamber of the measuring mechanism and from the bellows chamber the measured gas passes through an outlet passage 34 formed in the chamber 14 to the gas outlet 22 of the casting 18.

To operate the valve 30 so that it will act to limit the rate of flow of gas through the meter to a predetermined maximum, a diaphragm is directly connected with the valve which is moved in accordance with the difference in pressure of the gas at the inlet and outlet of the measuring mechanism. To this end a diaphragm chamber 38 is formed by a flange on the side of the casing 10. A diaphragm 42 is mounted in the chamber 38 between the face of the flange 36 and a cover 44 which encloses the diaphragm. The chamber 38 communicates with the chamber 14 through aperture 40 in the casing 10 so that the inner face of the diaphragm is subjected to the inlet gas pressure which exists in the chamber 14. A chamber 46 is formed between the outer face of the diaphragm 42 and the cover 44 and this chamber communicates by means of a passage 48 (Fig. 3) with the gas outlet passage 22 so that the outer face of the diaphragm is subjected to the pressure of the gas in the outlet of the meter. The diaphragm 42 has a stiffening plate 50 thereon and fixed to the upper end of the diaphragm 40 and plate 50 is a bracket 52 pivotally connected by a pin 54 to a rod 56 which is guided at one end in a support 58 in chamber 14. The rod 56 carries an adjustable finger 60 for operating the demand limiting valve 30, the finger 60 extending upwardly and having a locking engagement with the sides of a recess 62 on the underside of the valve 30. Fixed at one end to the pin 54 also is a spring 64, the other end of which is fixed to a screw 66 having a nut 68 thereon bearing against the support 58 previously mentioned, whereby the tension of the spring 64 may be adjusted.

In operation, the embodiment of my invention just described permits gas from inlet 20 to pass through the volumetric metering mechanism 12 to the outlet 22 in the usual manner so long as the rate of flow through the metering mechanism remains below a given rate fixed by the tension of the spring 64. However, the diaphragm 50 is subject on its inner face to the pressure of gas in the valve chamber 14, gas from said chamber being admitted to chamber 38 through aperture 40. The opposite face of diaphragm 42 is subject to pressure of gas in the outlet 22, outlet gas being admitted to chamber 46 through passage 48. Therefore as the rate of gas through meter 12 increases diaphragm 42 is subjected to an increasing pressure differential tending to move the diaphragm to the right as given in Fig. 2. Spring 64 is so adjusted that when the flow through mechanism 12 reaches a certain rate set as the maximum for the particular installation of the diaphragm 42 has moved the valve 30 to the right against spring 64 so that not more than the desired amount of gas can flow through the apparatus. Any tendency for the flow to increase above the desired amount merely draws the valve 30 further to the right to close the valve opening and restrict the gas flow.

It will be seen moreover that the arrangement described permits me to readily provide a relatively large diaphragm 42 for operating the demand limiting valve 30 whereby there is always ample power to operate the demand limiting valve even with small differentials of pressure. Further the movement of the demand limiting valve is comparatively large for small changes in pressure.

While I have described in detail an embodiment of my invention, I do not intend such description to be limiting.

Having thus described my invention, I claim:

1. The combination with a fluid meter having a mechanism for measuring the quantity of fluid passing therethrough, and means for restricting the rate of flow of fluid through the meter to a predetermined maximum, said means including an enclosed diaphragm having one side subject to pressure on the incoming side of the measuring mechanism and one side subject to pressure on the outgoing side, said diaphragm being responsive to the difference in pressure, a valve actuated by the diaphragm, and operating connections between said valve and said diaphragm.

2. The combination with a fluid meter for measuring the quantity of fluid passing therethrough of means associated therewith for restricting the rate of flow of fluid through the meter to a predetermined maximum, said means including an enclosed diaphragm having one side subject to pressure on the incoming side of the meter and one side subject to pressure on the outgoing side, said diaphragm being responsive to the difference in pressure, a valve at the inlet side of said meter actuated by the diaphragm, and operating connections intermediate said valve and said diaphragm.

3. The combination with a fluid meter having a housing, of means within the housing for restricting the rate of flow of fluid therethrough to a predetermined maximum, said means including a member responsive to the difference in pressure between the inlet and the outlet pressures of the meter.

4. The combination with a fluid meter having a housing, a diaphragm in the housing having separate chambers at each side thereof, one chamber being in communication with the inlet side of the meter and the other chamber being in communication with the outlet side, a valve for restricting the flow of gas through the meter, and means for transmitting movement from the diaphragm to the valve.

5. The combination with a meter having a removable cover at the upper part thereof, of means in the cover for restricting the rate of flow of fluid through the meter, means within the casing of said meter responsive to the difference in pressure between the inlet and the outlet sides of the meter, and operating connections between said means, said means and connections being arranged to restrict the rate of flow through said meter to a predetermined maximum.

6. The combination of a casing having a volumetric metering mechanism therein, a chamber in said casing enclosing the valves of said mechanism, a valve positioned to control the flow of gas to said chamber, means forming a chamber at one side of said casing, a diaphragm in said second mentioned chamber for operating said controlling valve, connections between said diaphragm and said controlling valve, means whereby said diaphragm is subjected to the pressure differential across said metering mechanism and means opposing the action of said diaphragm.

7. The combination of a casing having a volumetric metering mechanism therein, a slide valve adapted to control the flow of gas through said mechanism, a diaphragm subject to the drop in pressure across said mechanism, means whereby the drop in pressure across said mechanism is applied to opposite sides of said diaphragm, and means whereby said diaphragm operates said slide valve to limit the flow of gas through said mechanism to a predetermined maximum.

In testimony whereof I affix my signature.

JOHN F. KITCHEN.